(12) United States Patent
Luong et al.

(10) Patent No.: US 8,054,221 B1
(45) Date of Patent: Nov. 8, 2011

(54) METHODS FOR TESTING SATELLITE NAVIGATION SYSTEM RECEIVERS IN WIRELESS ELECTRONIC DEVICES

(75) Inventors: Anh Luong, Santa Clara, CA (US); Daniel C. Kong, Mountain View, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 12/946,813

(22) Filed: Nov. 15, 2010

(51) Int. Cl.
*G01S 19/23* (2010.01)
(52) U.S. Cl. .................................. 342/357.62
(58) Field of Classification Search ............ 342/357.62
See application file for complete search history.

(56) References Cited

U.S. PATENT DOCUMENTS

| | | | |
|---|---|---|---|
| 5,205,132 A * | 4/1993 | Fu ..................................... | 62/208 |
| 5,861,882 A * | 1/1999 | Sprenger et al. .............. | 715/700 |
| 6,184,824 B1 * | 2/2001 | Bode et al. ................ | 342/357.67 |
| 6,462,708 B1 * | 10/2002 | Tsujimoto et al. ........ | 342/357.43 |
| 7,415,246 B2 * | 8/2008 | Kim et al. ................... | 455/67.11 |
| 7,796,083 B2 * | 9/2010 | Hani et al. ............... | 342/357.62 |
| 7,889,123 B1 * | 2/2011 | Warloe .......................... | 342/165 |
| 7,956,804 B2 * | 6/2011 | Jin et al. ................... | 342/357.68 |
| 2001/0053176 A1 | 12/2001 | Fry et al. | |
| 2003/0214436 A1 * | 11/2003 | Voor et al. ..................... | 342/418 |
| 2004/0130484 A1 | 7/2004 | Krasner | |
| 2005/0032493 A1 | 2/2005 | Sugiyama et al. | |
| 2006/0082494 A1 * | 4/2006 | Deininger et al. ............ | 342/165 |
| 2007/0066268 A1 | 3/2007 | Simic et al. | |
| 2007/0285309 A1 * | 12/2007 | Atkinson ................. | 342/357.12 |
| 2008/0141072 A1 * | 6/2008 | Kalgren et al. ................. | 714/33 |
| 2010/0100766 A1 * | 4/2010 | Bengtsson et al. ............. | 714/23 |
| 2010/0117668 A1 | 5/2010 | Redlich et al. | |

FOREIGN PATENT DOCUMENTS

| | | |
|---|---|---|
| EP | 2120061 A1 | 11/2009 |
| WO | 2010114796 A1 | 10/2010 |

OTHER PUBLICATIONS

Sandhaus et al., "Integrated combo solutions", Texas Instruments White Paper, Apr. 2009.*
Dimpflmaier, Ronald W. et al. U.S. Appl. No. 12/638,850, filed Dec. 15, 2009.
Sanguinetti Louie J. et al. U.S. Appl. No. 61/363,485, filed Jul. 12, 2010.
Caballero, Ruben et al. U.S. Appl. No. 12/941,010, filed Nov. 5, 2010.

* cited by examiner

*Primary Examiner* — Thomas Tarcza
*Assistant Examiner* — Frank McGue
(74) *Attorney, Agent, or Firm* — Treyz Law Group; Jason Tsai

(57) ABSTRACT

A portable user device may provide Global Positioning System (GPS) services. The device may include a GPS receiver. The GPS receiver may provide accurate information about the current location of the device. A user may use the device to perform tasks. Certain tasks may generate excess heat or de-generate heat that causes the GPS receiver to perform unsatisfactorily. Methods are provided that can test GPS receiver performance during acquisition mode and during tracking mode. During testing, the GPS receiver may be given a predetermined amount of time to acquire a GPS fix. The GPS receiver may be tested repeatedly to acquire successive GPS fixes. After a desired number of tests are performed, a success rate may be calculated. If the success rate is satisfactory, the GPS receiver satisfies design criteria. If the success rate is not satisfactory, the GPS receiver may be reconfigured with new settings.

30 Claims, 10 Drawing Sheets

METHODS FOR TESTING SATELLITE NAVIGATION SYSTEM RECEIVERS IN WIRELESS ELECTRONIC DEVICES

BACKGROUND

This invention relates to electronic devices and more particularly, to portable electronic devices with satellite navigation system capabilities.

Electronic devices use satellite navigation systems to support navigation functions. For example, an electronic device may use a satellite navigation system such as the Global Positioning System (GPS) to obtain position information, timing information, and other navigation information. The Global Positioning System includes satellites that orbit the Earth, Earth-based control and monitoring stations, and GPS receivers that are located within the electronic devices. GPS services may be provided on a continuous basis anywhere that is within range of the orbiting satellites.

A portable electronic device may include a GPS receiver. The GPS receiver may sometimes be referred to as a GPS unit. The GPS unit determines the current position (location) of the portable electronic device. During operation, the GPS unit may receive data streams from GPS satellites orbiting the Earth. Using a local clock, the GPS unit analyzes each data stream to make a transit time and distance estimation.

A method known as geometric trilateration may be used to determine the location of the GPS unit by analyzing the estimated distances of each of the satellites to the GPS unit. The accuracy of location measurements made using the GPS unit depends on accuracy of the local clock. The local clock is typically implemented using a crystal oscillator. If the output of the oscillator exhibits errors, the GPS receiver may not function as expected.

Some GPS units are housed in dedicated handheld devices. Other GPS units are used in more complex devices such as cellular telephones. Devices such as these may have components whose operations can adversely affect GPS performance.

As an example, a cellular telephone may include cellular telephone transceiver circuitry that is used to make telephone calls. The cellular telephone transceiver circuitry includes power amplifier circuitry that transmits radio-frequency (RF) signals to a nearby base station. If care is not taken, a rapid change in heat generated from the power amplifier circuitry may adversely affect the accuracy of the oscillator in the GPS unit, thereby resulting in degraded GPS performance. Acquiring a GPS location measurement when making a phone call may therefore be unacceptably slow.

Conventional arrangements for testing GPS receiver performance involve measuring the performance of the GPS unit while the power amplifier circuitry is placed in an active mode that constantly transmits radio-frequency signals. The performance of the GPS unit, however, may be most adversely affected when the thermal transient (i.e., the instantaneous change in heat generated by the cellular telephone transceiver circuitry) is maximized. Testing GPS performance using the conventional approach is not a rigorous test of GPS performance, because leaving the power amplifier circuitry in the active mode does not maximize thermal transient.

It would therefore be desirable to be able to provide ways of testing GPS receiver performance.

SUMMARY

An electronic device such as a portable user device may provide satellite navigation system services such as Global Positioning System (GPS) services. The user device may include a satellite navigation receiver such as a GPS receiver, storage and processing circuitry, cellular telephone transceiver circuitry (cellular radio), etc. The GPS receiver may provide information such as a current location of the user device.

In addition to providing the GPS services, the user device may be used perform various tasks. For example, the user device may be used to make telephone calls, browse the Internet, run gaming applications, take pictures, etc. Performing these tasks may produce thermal transient that momentarily raises the temperature of the GPS receiver.

If the GPS receiver suffers from rapid changes in temperature (e.g., if a high temperature gradient is produced on a printed circuit board on which GPS circuitry is mounted), the GPS receiver may not function properly. It may be desirable to test GPS receiver performance in the presence of such thermal transient (i.e., heat-inducing) activities.

A test system in which a device under test (DUT) is tested may include test equipment such as a base station emulator and a test host. The base station emulator and the DUT may be coupled to the test host during testing.

The DUT may be operable in an acquisition mode or a tracking mode. During acquisition mode testing, the GPS receiver may be given a time to fix (TTF) to acquire a GPS fix (lock) during activating or deactivating a heat-inducing activity (e.g., in response to turning on or turning off power amplifier circuitry at a specific duty cycle). GPS data may be cleared from the DUT before attempting another GPS acquisition. After a desired number of tests have been performed, an acquisition success rate may be calculated. If the acquisition success rate satisfies a predetermined threshold, the GPS receiver satisfies performance criteria, and the DUT is marked as a passing DUT. If the acquisition success rate is less than the predetermined threshold, the DUT is marked as a failing DUT. The GPS receiver may be reconfigured with new settings aimed to improve GPS performance (e.g., to increase the distance between the GPS receiver and the cellular radio, or provide better ground plane to dissipate heat, or adding thermal pad).

During tracking mode testing, the GPS receiver may be given time-to-fix (TTF), and the GPS receiver may be in hot start. The GPS receiver may initially be given a sufficient amount of time to acquire fixes to update its ephemeris without any thermal effect activities. Subsequently, the GPS receiver may continue to acquire a GPS fix during activating or deactivating a thermal effect activity.

GPS data need not be cleared from the DUT before attempting another GPS fix. After a desired number of tests have been performed, a tracking success rate may be calculated. If the tracking success rate is greater than a predetermined threshold, the GPS receiver satisfies performance criteria. If the tracking success rate is less than the predetermined threshold, the GPS receiver may be reconfigured with new settings.

Further features of the present invention, its nature and various advantages will be more apparent from the accompanying drawings and the following detailed description.

DETAILED DESCRIPTION

This relates to techniques for testing the performance of Global Positioning System (GPS) receivers in electronic devices. Electronic devices such as portable electronic devices and other electronic equipment may provide GPS services.

An electronic device may include GPS circuitry that provides GPS capabilities. For example, the electronic device may be a laptop computer, a tablet computer, a somewhat smaller device such as a wrist-watch device, pendant device, headphone device, earpiece device, or other wearable or miniature device, a cellular telephone, a media player, etc. Electronic devices with GPS capabilities may provide a user with reliable positioning, navigation, and timing services (as examples). These GPS-based services may be used in navigation applications, games, applications with maps, and other location-based settings.

Figure 1:
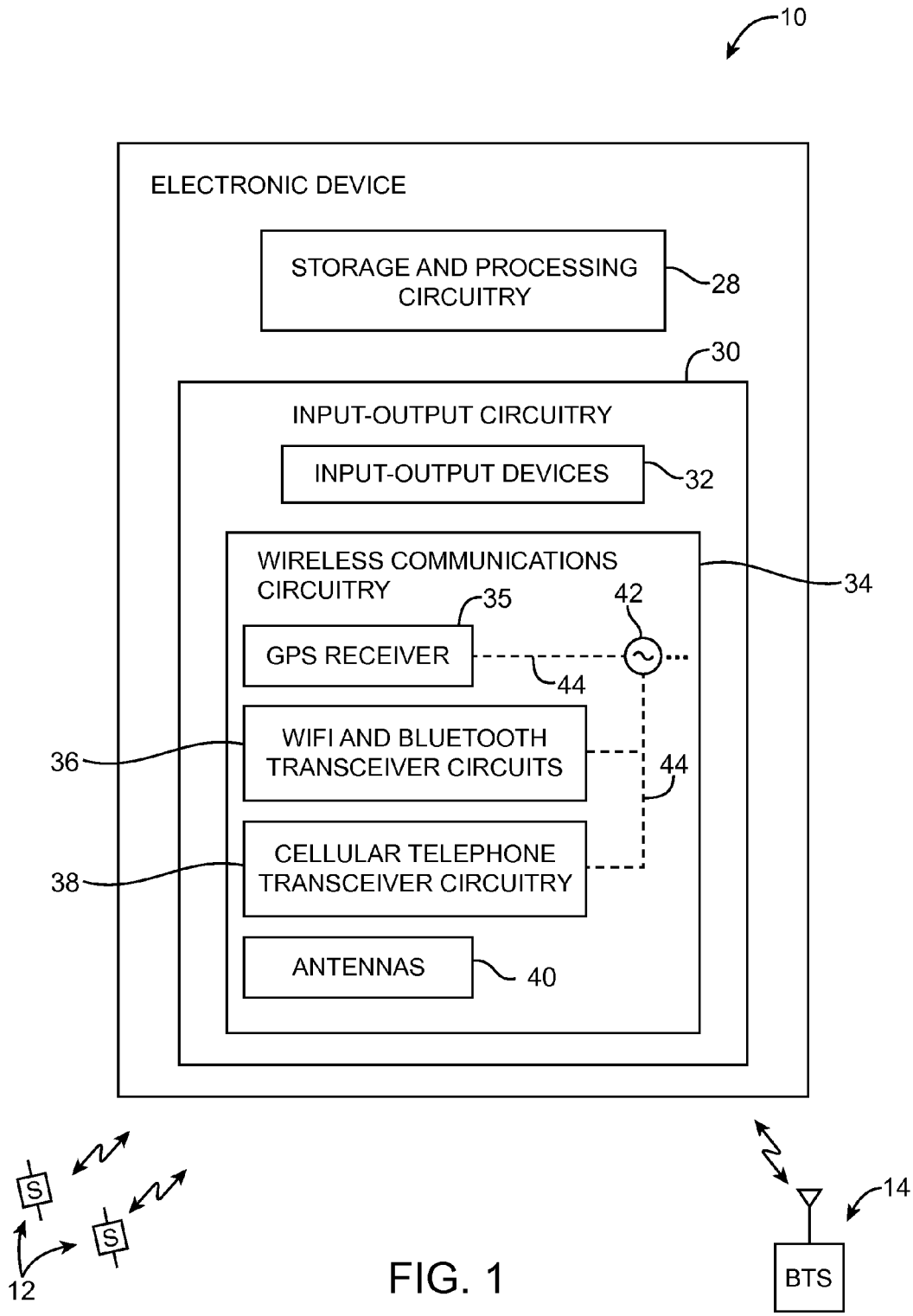
FIG. 1 is a schematic diagram of an illustrative electronic device with wireless communications circuitry in accordance with an embodiment of the present invention.

A schematic diagram of an electronic device such as electronic device 10 is shown in FIG. 1. As shown in FIG. 1, electronic device 10 may include storage and processing circuitry 28. Storage and processing circuitry 28 may include storage such as hard disk drive storage, nonvolatile memory (e.g., flash memory or other electrically-programmable-read-only memory configured to form a solid state drive), volatile memory (e.g., static or dynamic random-access-memory), etc. Processing circuitry in storage and processing circuitry 28 may be used to control the operation of device 10. This processing circuitry may be based on one or more microprocessors, microcontrollers, digital signal processors, baseband processors, power management units, audio codec chips, application specific integrated circuits, etc.

Storage and processing circuitry 28 may be used to run software on device 10, such as internet browsing applications, voice-over-internet-protocol (VoIP) telephone call applications, email applications, media playback applications, operating system functions, etc. To support interactions with external equipment, storage and processing circuitry 28 may be used in implementing communications protocols. Communications protocols that may be implemented using storage and processing circuitry 28 include internet protocols, wireless local area network (WLAN) protocols (e.g., IEEE 802.11 protocols—sometimes referred to as WiFi®), protocols for other short-range wireless communications links such as the Bluetooth® protocol, cellular telephone protocols, etc.

Circuitry 28 may be configured to implement control algorithms that control the use of antennas in device 10. For example, to support antenna diversity schemes and MIMO schemes or beam forming or other multi-antenna schemes, circuitry 28 may perform signal quality monitoring operations, sensor monitoring operations, and other data gathering operations and may, in response to the gathered data, control which antenna structures within device 10 are being used to receive and process data. As an example, circuitry 28 may control which of two or more antennas is being used to receive incoming radio-frequency signals, may control which of two or more antennas is being used to transmit radio-frequency signals, may control the process of routing incoming data streams over two or more antennas in device 10 in parallel, etc.

Input-output circuitry 30 may be used to allow data to be supplied to device 10 and to allow data to be provided from device 10 to external devices. Input-output circuitry 30 may include input-output devices 32. Input-output devices 32 may include touch screens, buttons, joysticks, click wheels, scrolling wheels, touch pads, key pads, keyboards, microphones, speakers, tone generators, vibrators, cameras, sensors, light-emitting diodes and other status indicators, data ports, etc. A user can control the operation of device 10 by supplying commands through input-output devices 32 and may receive status information and other output from device 10 using the output resources of input-output devices 32.

Wireless communications circuitry 34 may include radio-frequency (RF) transceiver circuitry formed from one or more integrated circuits, power amplifier circuitry, low-noise input amplifiers, passive RF components, one or more antennas, and other circuitry for handling RF wireless signals. Wireless signals can also be sent using light (e.g., using infrared communications).

Wireless communications circuitry 34 may include satellite navigation system receiver circuitry such as Global Positioning System (GPS) receiver circuitry 35 (e.g., for receiving satellite positioning signals at 1575 MHz) or GLONASS (e.g., for receiving satellite positioning signals at 1602 MHz), transceiver circuitry such as transceiver circuitry 36 and 38, and antenna circuitry 40. Transceiver circuitry 36 may handle 2.4 GHz and 5 GHz bands for WiFi® (IEEE 802.11) communications and may handle the 2.4 GHz Bluetooth® communications band. Circuitry 36 may sometimes be referred to as wireless local area network (WLAN) transceiver circuitry (to support WiFi® communications) and Bluetooth® transceiver circuitry. Circuitry 34 may use cellular telephone transceiver circuitry (sometimes referred to as cellular radio) 38 for handling wireless communications in cellular telephone bands such as bands at 850 MHz, 900 MHz, 1800 MHz, 1900 MHz, and 2100 MHz or other cellular telephone bands of interest.

Examples of cellular telephone standards that may be supported by wireless circuitry 34 and device 10 include: the Global System for Mobile Communications (GSM) "2G" cellular telephone standard, the Evolution-Data Optimized (EVDO) cellular telephone standard, the "3G" Universal Mobile Telecommunications System (UMTS) cellular telephone standard, the "3G" Code Division Multiple Access 2000 (CDMA 2000) cellular telephone standard, and the "4G" Long Term Evolution (LTE) cellular telephone standard. Other cellular telephone standards may be used if desired. These cellular telephone standards are merely illustrative.

Wireless communications circuitry 34 may include circuitry for other short-range and long-range wireless links if desired. For example, wireless communications circuitry 34 may include wireless circuitry for receiving radio and television signals, paging circuits, etc. In WiFi® and Bluetooth® links and other short-range wireless links, wireless signals are typically used to convey data over tens or hundreds of feet. In cellular telephone links and other long-range links, wireless signals are typically used to convey data over thousands of feet or miles.

Wireless communications circuitry 34 may include antennas 40. Antennas 40 may be formed using any suitable antenna types. For example, antennas 40 may include antennas with resonating elements that are formed from loop antenna structure, patch antenna structures, inverted-F antenna structures, closed and open slot antenna structures, planar inverted-F antenna structures, helical antenna structures, strip antennas, monopoles, dipoles, hybrids of these designs, etc. Different types of antennas may be used for different bands and combinations of bands. For example, one type of antenna may be used in forming a local wireless link and another type of antenna may be used in forming a remote wireless link.

Wireless communications circuitry 34 may include an oscillator such as crystal oscillator 42. Crystal oscillator 42 may provide a highly stable local clock that is used as a reference clock signal. As shown in FIG. 1, oscillator 42 may feed local clock signals to GPS receiver (unit) 35, transceiver circuits 36, cellular radio 38, and other wireless circuits over path 44. If desired, wireless communications circuitry 34 may include a plurality of oscillators 42, where each of the plurality of oscillators 42 is used to generate a stable local clock signal for a respective transceiver circuit.

GPS receiver 35 may receive GPS signals from GPS satellites 12 as satellites 12 orbit the Earth. GPS receiver 35 may use the clock signals generated by oscillator 42 to calculate its position by precisely timing the signals that are being transmitted by GPS satellites 12. For example, each GPS satellite 12 may continuously broadcast signals to GPS receiver 35. The broadcasted signals may include information such as the time the signals were sent, relevant orbital information (e.g., the precise location of each satellite), and other related information.

GPS receiver 35 may receive the broadcasted GPS satellite information. GPS receiver 35 may analyze the times at which the signals are received. GPS receiver 35 may rely on crystal oscillator (local clock) 42 to make precise timing measurements on received signals. GPS receiver 35 may calculate the transit time for each received signal based on these timing measurements. The transit time of each message may be multiplied by the speed of light (e.g., the speed at which wireless signals propagate through air) to compute the distance between user device 10 and each corresponding GPS satellite 12.

Geometric trilateration techniques may then be used to combine the computed distances with the GPS satellites' current locations to determine the position (location) of GPS receiver 35. GPS receiver 35 may feed GPS data to storage and processing circuitry 28. The process of obtaining the current location of device 10 is sometimes referred to as obtaining a satellite navigation system fix (or GPS fix). In addition to determining the current location, GPS receiver 35 may provide time-to-fix (TTF) data (e.g., data indicating the amount of time it takes for receiver 35 to acquire an updated GPS fix). GPS receiver 35 may also be used to obtain other useful location information (e.g., to determine the altitude, direction, and speed of device 10).

As shown in FIG. 1, device 10 may communicate with a base station such as base transceiver station 14. In particular, radio-frequency signals may be conveyed between cellular telephone transceiver circuitry (cellular radio) 38 and base station 14 during a phone call (as an example). Cellular radio 38 may rely on local clock signals generated by the same oscillator 42 used by GPS receiver 35 or by a separate oscillator 42 to process radio-frequency signals at desired frequencies during cellular transmission.

The accuracy of the position obtained by GPS receiver 35 is strongly dependent on the accuracy of crystal oscillator 42. Even a small clock error in oscillator 42 may not be acceptable if precise GPS location data is desired within an allotted time limit. Small clock (frequency) errors may be magnified when multiplied by the speed of light (e.g., a very large number), resulting in a large positional error.

The accuracy of crystal oscillator 42 is generally acceptable during normal operating conditions (e.g., when device 10 is not running processor-intensive applications and is not using heat-producing components). The accuracy of GPS receiver 35 may, however, be adversely affected by heat-inducing operations on device 10. For example, a sudden change in temperature (e.g., a high temperature gradient or low temperature gradient) produced as cellular radio 38 is enabled (or disabled) can result in a longer time-to-fix or missing fix. It may therefore be desirable to test GPS receiver performance in the presence of high/low-temperature-gradient-inducing activities.

Figure 2:
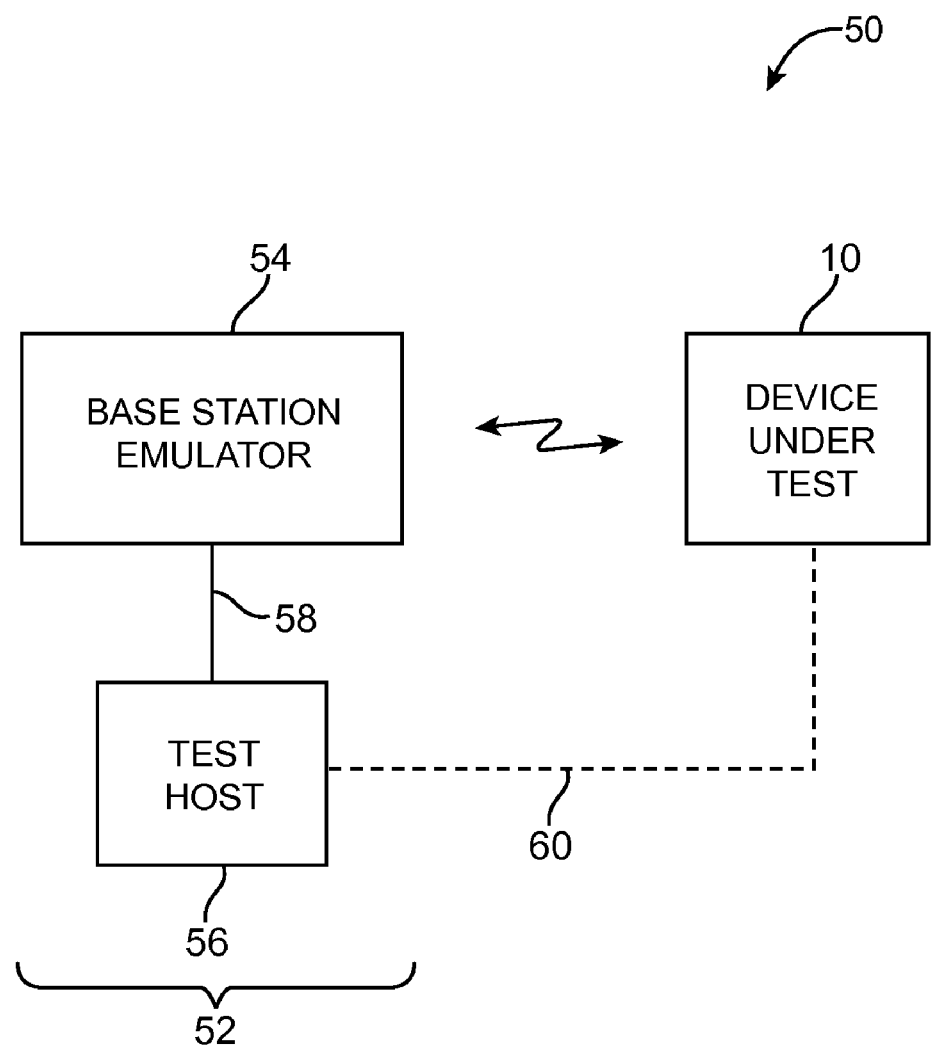
FIG. 2 is a diagram of an illustrative test system in accordance with an embodiment of the present invention.

FIG. 2 is a diagram showing a test system in which device 10 can be tested. Device 10 being tested may sometimes be referred to as a device under test (DUT). Test system 50 may include test equipment 52 that is used to test DUT 10. Test equipment 52 may include base station emulator 54, test host 56, control circuitry, network circuitry, cabling, and other test equipment. Base station emulator 54 is a device that emulates the behavior of an actual base transceiver station. Base station emulator 54 may communicate with DUT 10 over a wireless path or over a wired connection in test system 50.

Base station emulator 54 may be coupled to test host 56 (e.g., a personal computer) through line 58. DUT 10 may be coupled to test host 56 through dotted line 60. The connection represented by line 60 may be a Universal Serial Bus (USB) based connection, a Universal Asynchronous Receiver/Transmitter (UART) based connection, or other suitable types of connections. DUT 10 may transmit test data to test host 56 over line 60 or through base station emulator 54.

GPS receiver 35 may be operable in an acquisition mode and a tracking mode. When GPS receiver 35 is turned on, GPS receiver 35 may retrieve GPS information stored on storage and processing circuitry 28. GPS receiver 35 may calculate an updated location (fix) based on the retrieved GPS information. For example, a first scenario in which GPS receiver 35 is enabled to acquire a new GPS fix and storage circuitry 28 contains no previously calculated location data may be referred to as a "cold" start. A second scenario in which GPS receiver 35 is enabled to acquire a GPS lock and storage circuitry 28 contains previously calculated location data but no information indicating which satellites 12 were previously in view may be referred to as a "warm" start. A third scenario in which GPS receiver 35 is enabled to calculate a GPS lock and storage circuitry 28 contains previously calculated location data and information indicating which satellites 12 were previously in view may be referred to as a "hot" start.

Figure 3:
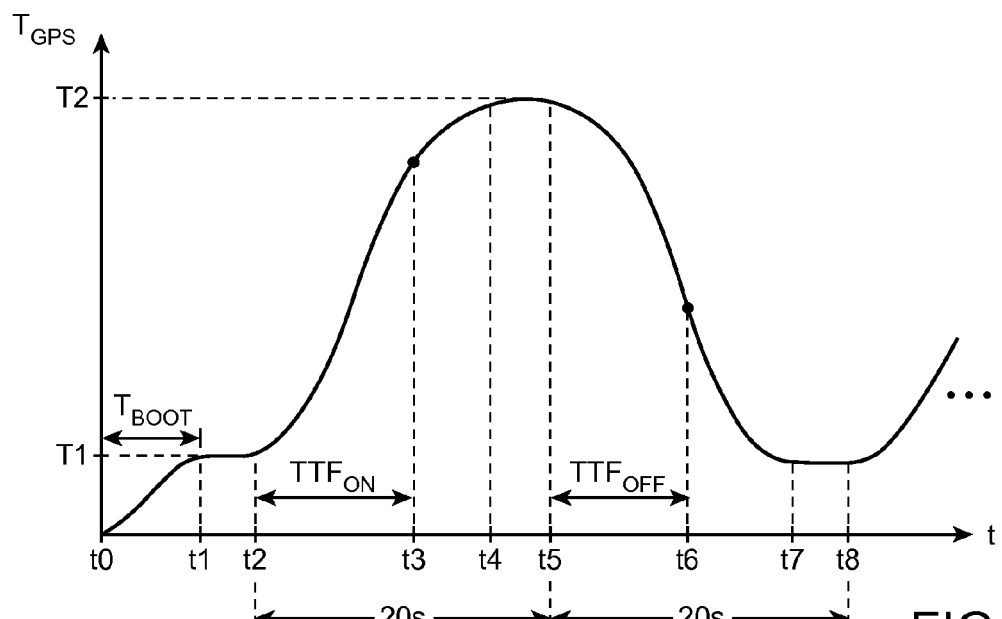
FIG. 3 is a graph illustrating how the temperature of a Global Positioning System (GPS) receiver may vary in time as thermal transient operations are performed during acquisition mode testing in accordance with an embodiment of the present invention.

DUT 10 may be tested while GPS receiver 35 is operating in the acquisition mode (e.g., for GPS factory cold start, cold start, or warm start) and in the tracking mode (e.g., for GPS hot start). FIG. 3 is a graph showing how the temperature of GPS receiver 35 ($T_{GPS}$) may vary in time during acquisition mode testing of DUT 10. At time t0, DUT 10 is turned on. DUT 10 may be loaded with a test operating system (e.g., so that the behavior of DUT 10 may be directly controlled using test host 56). Storage and processing circuitry 28 may not include any previously calculated location data prior to time t0.

At time t1, $T_{GPS}$ reaches normal operating temperature T1. The time it takes for DUT 10 to power up (e.g., the time period from time t0 to t1) may be referred to as boot-up time $T_{BOOT}$.

At time t2, GPS receiver 35 may be turned on and DUT 10 may be directed to perform certain tasks that cause internal device circuitry (e.g., storage and processing circuitry 28, cellular radio 28, transceiver circuits 36, etc.) to generate additional heat. For example, a user may want to make a telephone call, start a gaming application, launch a web browser, etc. Different tasks may vary in processing intensity and may cause the peripheral circuitry to generate different heat profiles.

Consider a scenario in which DUT 10 is directed to begin cellular transmission by turning on cellular radio 38 at time t2. Activating cellular transmission may involve turning on power amplifier circuitry in radio 38. Turning on the power amplifier circuitry may cause temperature $T_{GPS}$ to rise rapidly (see, e.g., FIG. 3).

Figure 4:
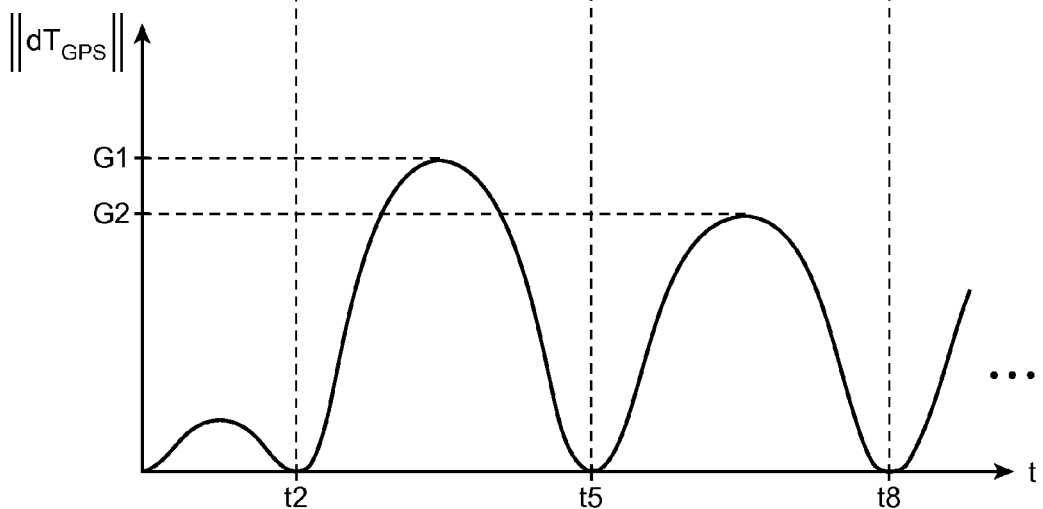
FIG. 4 is a graph showing how the Global Positioning System receiver of FIG. 3 may experience a temperature gradient that varies in time in accordance with an embodiment of the present invention.

This sudden change in $T_{GPS}$ is illustrated in FIG. 4. FIG. 4 is a graph showing the magnitude of the temperature gradient $\|\delta T_{GPS}\|$ as a function of time. Temperature gradient is a measure of the instantaneous change in $T_{GPS}$. The temperature gradient characteristic curve of FIG. 4 can be calculated by taking the first derivative of the temperature curve of FIG. 3 (as an example). As shown in FIG. 4, temperature gradient $\|\delta T_{GPS}\|$ reaches a peak at gradient level G1 after time t2. The ability of GPS receiver 35 to acquire a GPS fix may be adversely affected by such high temperature gradient levels.

At time t3, GPS receiver 35 may acquire a GPS fix (e.g., GPS receiver 35 may acquire an updated/current location of device 10). The time it takes for GPS receiver 35 to acquire the GPS fix in response to turning on radio circuitry 38 is indicated by time-to-fix $TTF_{ON}$. At time t4, storage and processing circuit 28 may clear the recently acquired GPS data so that a successive GPS acquisition remains a cold start (e.g., to continue acquisition mode testing). At time t4, $T_{GPS}$ may settle to temperature T2 while temperature gradient $\|\delta T_{GPS}\|$ falls back down to a low value.

At time t5, the temperature-inducing task may be turned off (e.g., cellular radio 38 may be turned off). Similarly, turning off the power amplifier circuitry in radio 38 may cause temperature $T_{GPS}$ to fall. As shown in FIG. 4, temperature gradient $\|\delta T_{GPS}\|$ reaches a peak at gradient level G2 after time t5. Level G2 may have the same value as G1 or may be greater than G1. The ability of GPS receiver 35 to acquire a GPS fix may be adversely affected by such high temperature gradient levels.

At time t6, GPS receiver 35 may acquire a GPS fix. The time it takes for GPS receiver 35 to acquire the GPS fix in response to turning off radio circuitry 38 is indicated by time-to-fix $TTF_{OFF}$. At time t7, storage and processing circuit 28 may clear the recently acquired GPS data so that a successive GPS acquisition remains a cold start. At time t7, temperature gradient $\|\delta T_{GPS}\|$ may fall back down to a low value. At time t8, cellular radio 38 may be turned on to continue testing GPS receiver 35 in the acquisition mode.

$TTF_{ON}$ may be different than $TTF_{OFF}$. The amount of heat generated when turning on cellular radio 38 may be different from the amount of heat de-generated when turning off cellular radio 38 (as an example). Also, when cellular radio 38 is on, the radio-frequency signals transmitted by the power amplifier circuitry may interfere with the operation of GPS receiver 35 to degrade $TTF_{ON}$.

As shown in FIG. 3, the test time allotted for GPS receiver to acquire a fix in response to enabling a heat-inducing task (e.g., from time t2 to t5) and in response to disable the heat-inducing task (e.g., from time t5 to t8) may, for example, be 20 seconds. GPS receiver 35 may or may not be able to acquire a GPS fix during this allotted time period. If desired, the allotted (predetermined) time period during acquisition mode testing may be less than 20 seconds or more than 20 seconds.

GPS receiver 35 may include an automatic frequency correction (AFC) circuit to help compensate for sudden changes in temperature. Even with the help of the AFC circuit, the ability of GPS receiver 35 to accurately acquire a GPS lock in the presence of high temperature-gradient-inducing activities may vary because of process, voltage, and temperature variations. As a result, some GPS receivers may be more robust than others. The more robust GPS receivers may be capable of acquiring a GPS fix during the predetermined time period, whereas the less robust GPS receivers may fail to acquire a GPS fix during the predetermined time period.

Figure 5:
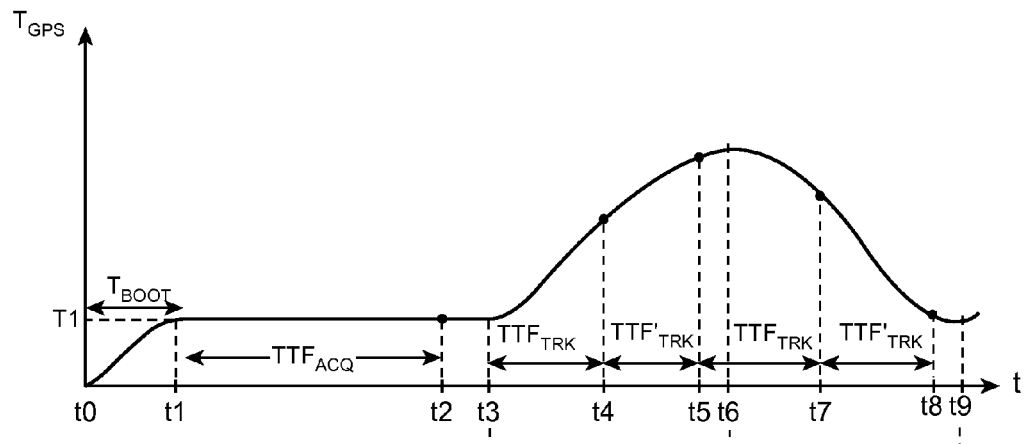
FIG. 5 is a graph illustrating how the temperature of a Global Positioning System receiver may vary in time as thermal transient operations are performed during tracking mode testing in accordance with an embodiment of the present invention.

DUT 10 may also be tested while GPS receiver 35 is operating in the tracking mode (e.g., for GPS hot starts). FIG. 5 is a graph showing how $T_{GPS}$ may vary in time during tracking mode testing of DUT 10. At time t0, DUT 10 is turned on. After boot-up time $T_{BOOT}$, $T_{GPS}$ may reach normal operating temperature T1 (at time t1). At time t1, GPS receiver 35 may be turned on to acquire new GPS fixes. Storage and processing circuitry 28 does not include any previously calculated location data prior to time t0.

At time t2, GPS receiver 35 may acquire a GPS acquisition fix. The time it takes for GPS receiver 35 to acquire the new GPS following start-up (e.g., cold start) may sometimes be referred to as acquisition time-to-fix $TTF_{ACQ}$. $TTF_{ACQ}$ may be 15 seconds (as an example). GPS receiver 35 may be given sufficient time to acquire this initial GPS fix. During the duration between t2 and t3, GPS receiver 35 may acquire several tracking fixes to ensure that the DUT may have the update ephemeris.

At time t3, DUT 10 may be directed to perform certain tasks that cause internal device circuitry to generate additional heat. For example, consider a scenario in which DUT 10 is directed to begin cellular transmission by turning on cellular radio 38. Activating cellular transmission may involve turning on power amplifier circuitry in circuitry 38. Turning on the power amplifier circuitry may cause temperature $T_{GPS}$ to rise rapidly (see, e.g., FIG. 5). This sudden change in $T_{GPS}$ is illustrated in the temperature gradient plot of FIG. 6.

While $T_{GPS}$ is rising, GPS receiver 35 may acquire a first GPS fix (e.g., GPS receiver 35 may acquire an updated/current location of device 10) at time t4. The time it takes for GPS receiver 35 to acquire the first GPS fix during turning on radio circuitry 38 is indicated by time-to-fix $TTF_{TRK}$. $TTF_{TRK}$ may be less than $TTF_{ACQ}$, because the time-to-fix based on a hot start is significantly shorter than the time-to-fix based on a cold start. $TTF_{TRK}$ may be as short as 1.5 sec (as an example). At time t4, $T_{GPS}$ may continue to rise, because not much time has passed since turning on the power amplifier circuitry (e.g., temperature gradient $\|\delta T_{GPS}\|$ stays high after t4).

While $T_{GPS}$ continues to rise, GPS receiver may acquire a second GPS fix (at time t5). The time it takes for GPS receiver 35 to acquire the second fix following acquisition of the first GPS fix is indicated by time-to-fix $TTF'_{TRK}$. $TTF'_{TRK}$ may be less than $TTF_{TRK}$, greater than $TTF_{TRK}$, or approximately equal to $TTF_{TRK}$.

As shown in this example, GPS receiver 35 is capable of acquiring two GPS fixes within a predetermined allotted time period (e.g., four seconds). It may be desirable to test the ability of GPS receiver 35 to acquiring multiple GPS fixes during the allotted time period. The predetermined allotted time period may at least two seconds, at least 4 seconds, at least eight seconds, etc.

Figure 6:
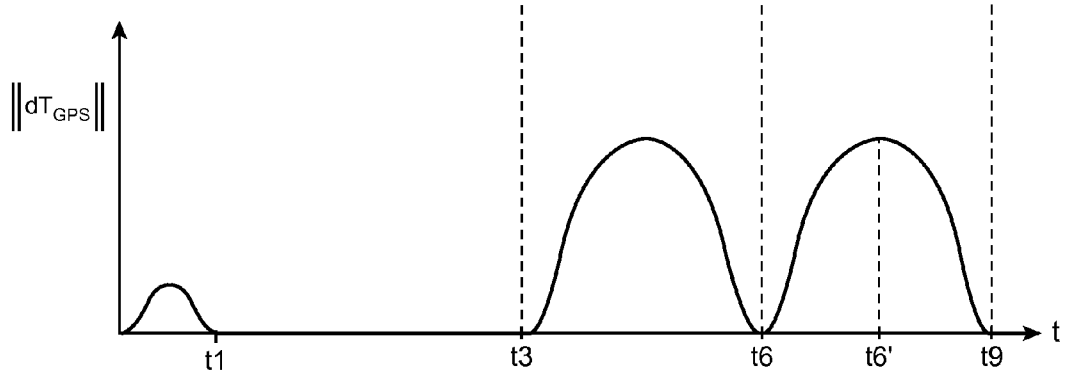
FIG. 6 is a graph showing how the Global Positioning System receiver of FIG. 5 may experience a temperature gradient that varies in time in accordance with an embodiment of the present invention.

At time t6, the temperature-inducing task may be disabled (e.g., cellular radio 38 may be turned off). Turning off the power amplifier circuitry in radio 38 may cause temperature $T_{GPS}$ to fall. As shown in FIG. 6, temperature gradient $\|\delta T_{GPS}\|$ reaches a peak gradient level at time t6' in response to turning off the power amplifier circuitry in radio 38. The ability of GPS receiver 35 to acquire a GPS fix may be adversely affected by such high temperature gradient levels.

While $T_{GPS}$ is falling, GPS receiver 35 may acquire a first GPS fix (at time t7). The time it takes for GPS receiver 35 to acquire the first GPS fix during the process of turning off radio circuitry 38 is indicated by time-to-fix $TTF_{TRK}$. At time t7, $T_{GPS}$ may continue to fall, because not much time has passed since turning off the power amplifier circuitry (e.g., temperature gradient $\|\delta T_{GPS}\|$ stays high after t7). While $T_{GPS}$ continues to fall, GPS receiver may acquire a second GPS fix (at time t8). The time it takes for GPS receiver 35 to acquire the second fix following acquisition of the first GPS fix is indicated by time-to-fix $TTF'_{TRK}$. $TTF'_{TRK}$ may be less than $TTF_{TRK}$, greater than $TTF_{TRK}$, or approximately equal to $TTF_{TRK}$. At time t9, cellular radio 38 may be turned on to continue testing GPS receiver 35 in the tracking mode.

FIG. 5 illustrates a scenario in which GPS receiver 35 is capable of obtaining at least two GPS tracking fixes within the allotted time period. As shown in FIG. 5, the test time allotted for GPS receiver to acquire a fix in response to enabling a heat-inducing task (e.g., from time t3 to t6) and in response to disable the heat-inducing task (e.g., from time t6 to t9) may, for example, be four seconds. GPS receiver 35 may or may not be able to acquire multiple GPS fixes during this predetermined allotted time period. The allotted time period for GPS receiver 35 to obtain a GPS fix during tracking mode testing may be significantly shorter than the allotted time period for GPS receiver 35 to obtain a GPS fix during acquisition mode testing. If desired, the predetermined time period for tracking mode testing may be less than four seconds or more than four seconds.

The timing diagrams of FIGS. 3-6 are merely illustrative. The heat experienced by GPS receiver 35 during acquisition mode and during tracking mode may have any suitable temperature profile.

Different types of test arrangements may be used during testing of DUT 10. In one suitable arrangement, DUT 10 may be tested using a "non-signaling" test arrangement. The non-signaling test approach may be suitable for testing DUT 10 that includes a first oscillator 42 for cellular circuitry and a second oscillator 42 for GPS circuitry (as an example). The non-signaling test may involve configuring DUT 10 with a test operating system and directing radio circuitry 38 to broadcast radio-frequency signals at a maximum output power level without establishing a protocol-based wireless connection with base station emulator 54 (e.g., base station emulator may not be used during non-signaling testing).

Figure 7:
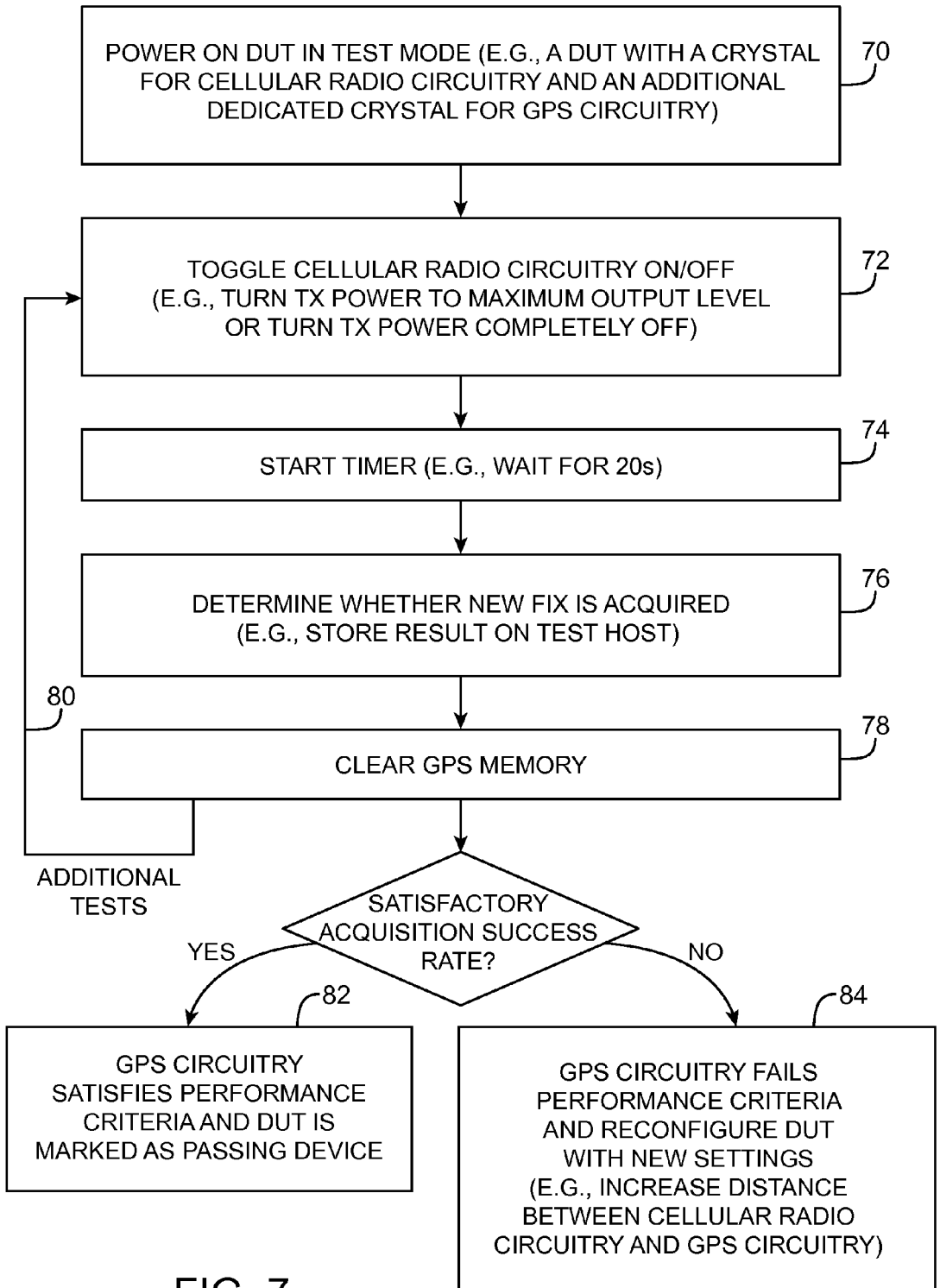
FIG. 7 is a flow chart of illustrative steps involved in non-signaling acquisition mode testing of Global Positioning System receiver performance in accordance with an embodiment of the present invention.

FIG. 7 shows steps involved in acquisition mode testing of DUT 10 using the non-signaling arrangement. At step 70, DUT 10 (e.g., a DUT with a crystal for cellular radio and another crystal for GPS circuitry) is powered on.

At step 72, cellular radio circuitry 38 may be toggled on or off (e.g., the power amplifier circuitry may be configured to transmit RF signals at maximum output power level or may be turned completely off).

At step 74, a timer may be started to allow GPS receiver 35 to acquire a GPS fix within an allotted (predetermined) acquisition time period (e.g., a 20 second time period). At step 76, DUT 10 may determine whether a new GPS fix has been acquired during the allotted time. Data indicating whether or not a GPS fix has been acquired may be stored on test host 56.

At step 78, GPS location data stored on storage and processing circuitry 28 may be cleared to continue acquisition mode testing. Processing may loop back to step 72 to perform additional test iterations, as indicated by path 80.

After a sufficient number of test iterations, an acquisition success rate may be calculated using test host 56. The acquisition success rate may be defined as the ratio (or percentage) of the number of successful GPS fixes acquired within the predetermined time period to the total number of test iterations. For example, consider a scenario in which 77 test iterations are performed. According to the 3GPP TS 34.171 specification, if a user desires a 95% acquisition success rate, all 77 fixes will have to be acquired to satisfy pass criteria.

If the acquisition success rate is satisfactory, GPS receiver 35 satisfies design criteria and DUT 10 is marked as a passing DUT (step 82). If the acquisition success rate is not satisfactory, GPS receiver 35 fails to satisfy design criteria (step 84). If desired, DUT 10 may be configured with new design settings (e.g., the distance between cellular radio circuitry 38 and GPS receiver circuitry 35 may be increased to reduce the interference between circuitry 38 and 35 and to further isolate GPS circuitry 35 from the heat generated by circuitry 38).

The steps of FIG. 7 are merely illustrative. If desired, WiFi® and Bluetooth® transceiver circuits 36 may be toggled on or off at step 72 while cellular radio circuitry 38 remains off during the entirety of the acquisition mode testing. Enabling and disabling transceiver circuits 36 may generate rapid changes in $T_{GPS}$ to introduce stress that negatively impacts the performance of GPS receiver 35. If desired, radio circuitry 38 and transceiver circuitry 36 may simultaneously be toggled on or off at step 72 during acquisition mode testing. For example, circuitry 36 and 38 may both be turned on at time t2 and may both be turned off at time t5 (see, e.g., timing diagram of FIGS. 3 and 4).

Figure 8:
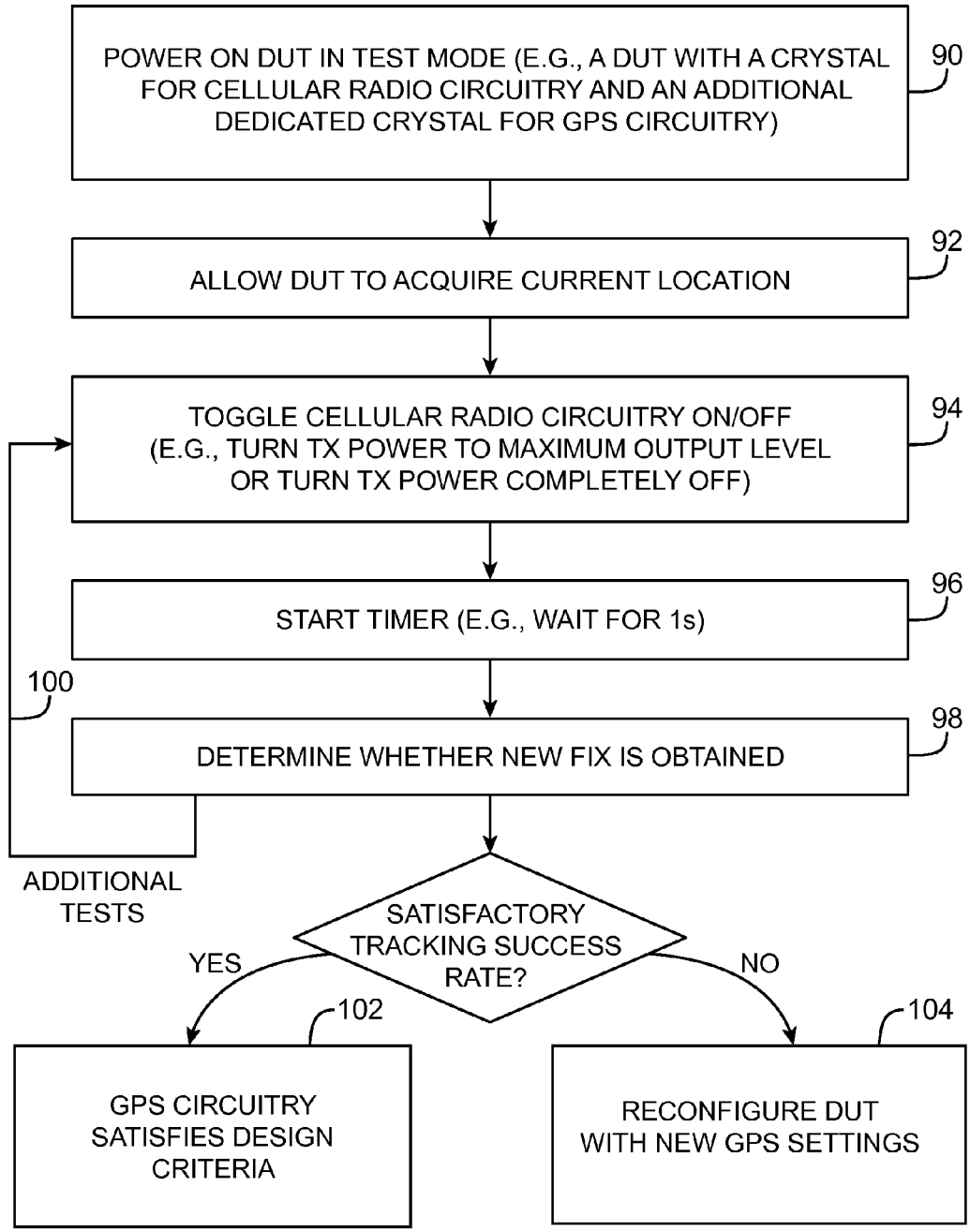
FIG. 8 is a flow chart of illustrative steps involved in non-signaling tracking mode testing of Global Positioning System receiver performance with an embodiment of the present invention.

FIG. 8 shows steps involved in tracking mode testing of DUT 10 using the non-signaling arrangement. At step 90, DUT 10 (e.g., a DUT with a crystal for cellular radio and another crystal for GPS circuitry) is powered on. At step 92, DUT 10 may be given sufficient time to acquire a GPS fix, while the cellular radio may be turn off. At step 94, cellular radio circuitry 38 may be toggled on or off (e.g., the power amplifier circuitry may be configured to transmit RF signals at maximum output power level or may be turned completely off).

At step 96, a timer may be started to allow GPS receiver 35 to acquire a GPS fix within an allotted tracking time period (e.g., a four seconds time period). At step 98, DUT 10 may determine whether at least two GPS fixes have been acquired during the allotted time. Data indicating whether or not multiple GPS fixes have been acquired may be stored on test host 56.

GPS location data stored on storage and processing circuitry 28 need not be cleared for tracking mode testing. Processing may loop back to step 94 to perform additional test iterations, as indicated by path 100.

After a sufficient number of test iterations, a tracking success rate may be calculated using test host 56. If the tracking success rate is satisfactory, GPS receiver 35 satisfies design criteria and DUT 10 is marked as a passing DUT (step 102). If tracking success rate is not satisfactory, GPS receiver 35 fails to satisfy design criteria, and DUT 10 may be configured with new design settings aimed to improve GPS performance (step 104).

The steps of FIG. 8 are merely illustrative. If desired, WiFi® and Bluetooth® transceiver circuits 36 may be toggled on or off at step 94 while cellular radio circuitry 38 remains off during the entirety of the tracking mode testing. Enabling and disabling transceiver circuits 36 may generate rapid changes in $T_{GPS}$ to introduce stress that negatively impacts the performance of GPS receiver 35. If desired, radio circuitry 38 and transceiver circuitry 36 may simultaneously be toggled on or off at step 94 during tracking mode testing. For example, circuitry 36 and 38 may both be turned on at time t3 and may both be turned off at time t6 (see, e.g., timing diagram of FIGS. 5 and 6).

In another suitable arrangement, DUT 10 may be tested using a "signaling" test arrangement. The signaling test approach may be suitable for testing DUT 10 that includes a shared oscillator 42 for cellular circuitry and GPS circuitry (as an example). The signaling test may involve configuring DUT with a normal user operating system (e.g., DUT 10 may be loaded with default user applications, graphical user interface, etc.). If desired, DUT 10 may be configured in the test mode described in connection with FIGS. 7 and 8.

Figure 9:
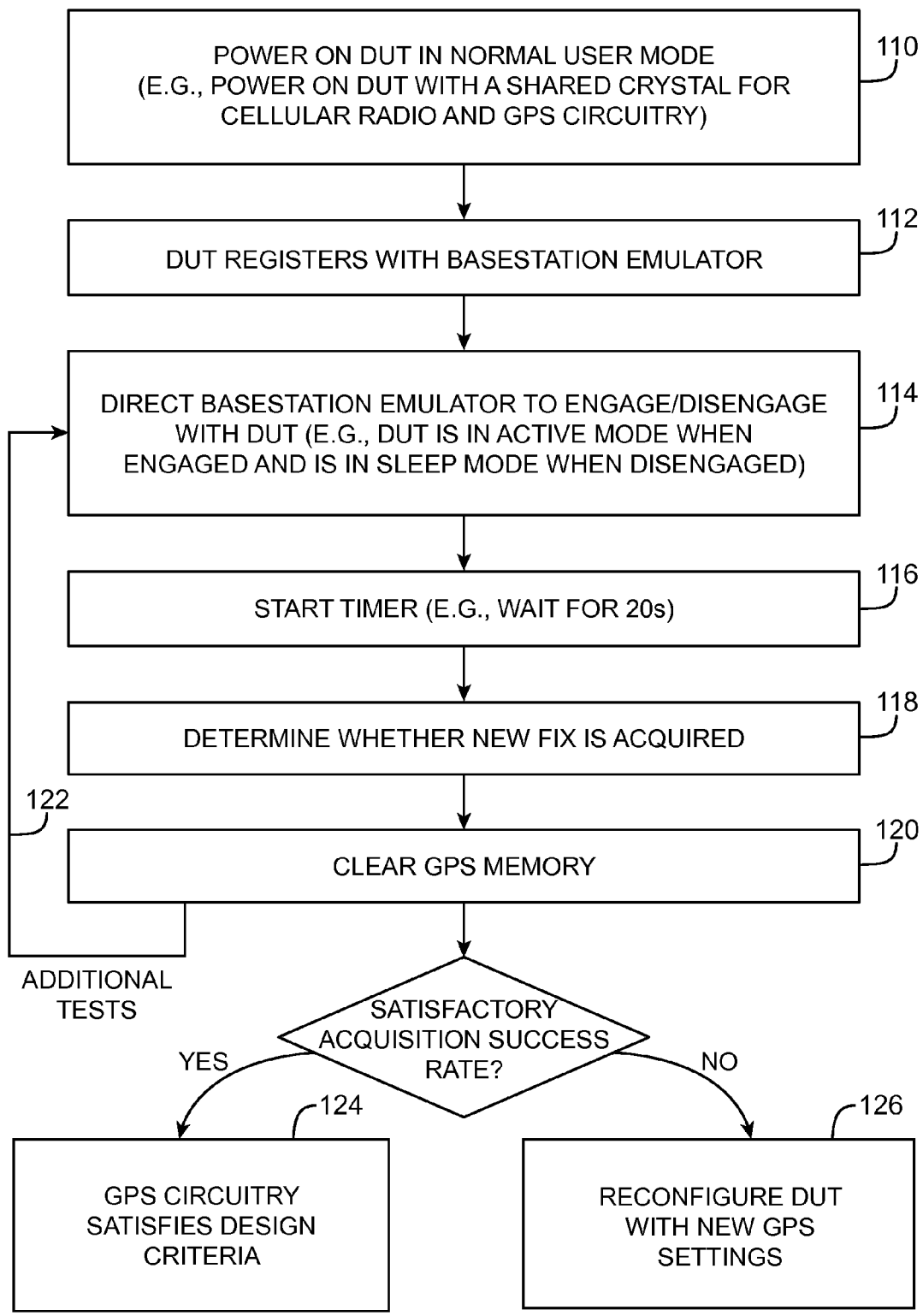
FIG. 9 is a flow chart of illustrative steps involved in signaling acquisition mode testing of Global Positioning System receiver performance in accordance with an embodiment of the present invention.

FIG. 9 shows steps involved in acquisition mode testing of DUT 10 using the signaling arrangement. At step 110, DUT 10 (e.g., a DUT with a shared crystal for cellular radio and for GPS circuitry) is powered on. At step 112, DUT 10 automatically registers with base station emulator 54 (e.g., DUT 10 notifies base station emulator 54 of its presence).

At step 114, test host 56 may direct base station emulator 54 to engage/disengage with DUT 10. When base station emulator 54 is engaged with DUT 10, cellular radio 38 is in an active mode (e.g., cellular radio 38 is actively transmitting radio-frequency signals to base station emulator 54 over a protocol-based wireless connection). When base station emulator 54 is disengaged with DUT 10, cellular radio 38 is in a sleep mode.

At step 116, a timer may be started to allow GPS receiver 35 to acquire a GPS fix within an allotted acquisition time period (e.g., a 20 second time period). At step 118, DUT 10 may determine whether a new GPS fix has been acquired during the allotted time. Data indicating whether or not a GPS fix has been acquired may be stored on test host 56.

At step 120, GPS location data stored on storage and processing circuitry 28 may be cleared to continue acquisition mode testing. Processing may loop back to step 114 to perform additional test iterations, as indicated by path 122.

After a sufficient number of test iterations, an acquisition success rate may be calculated using test host 56. If the acquisition success rate is satisfactory, GPS receiver 35 satisfies design criteria, and DUT 10 is marked as a passing DUT (step 124). If acquisition success rate is not satisfactory, GPS receiver 35 fails to satisfy design criteria, and DUT 10 may be reconfigured with new design settings (step 126).

Figure 10:
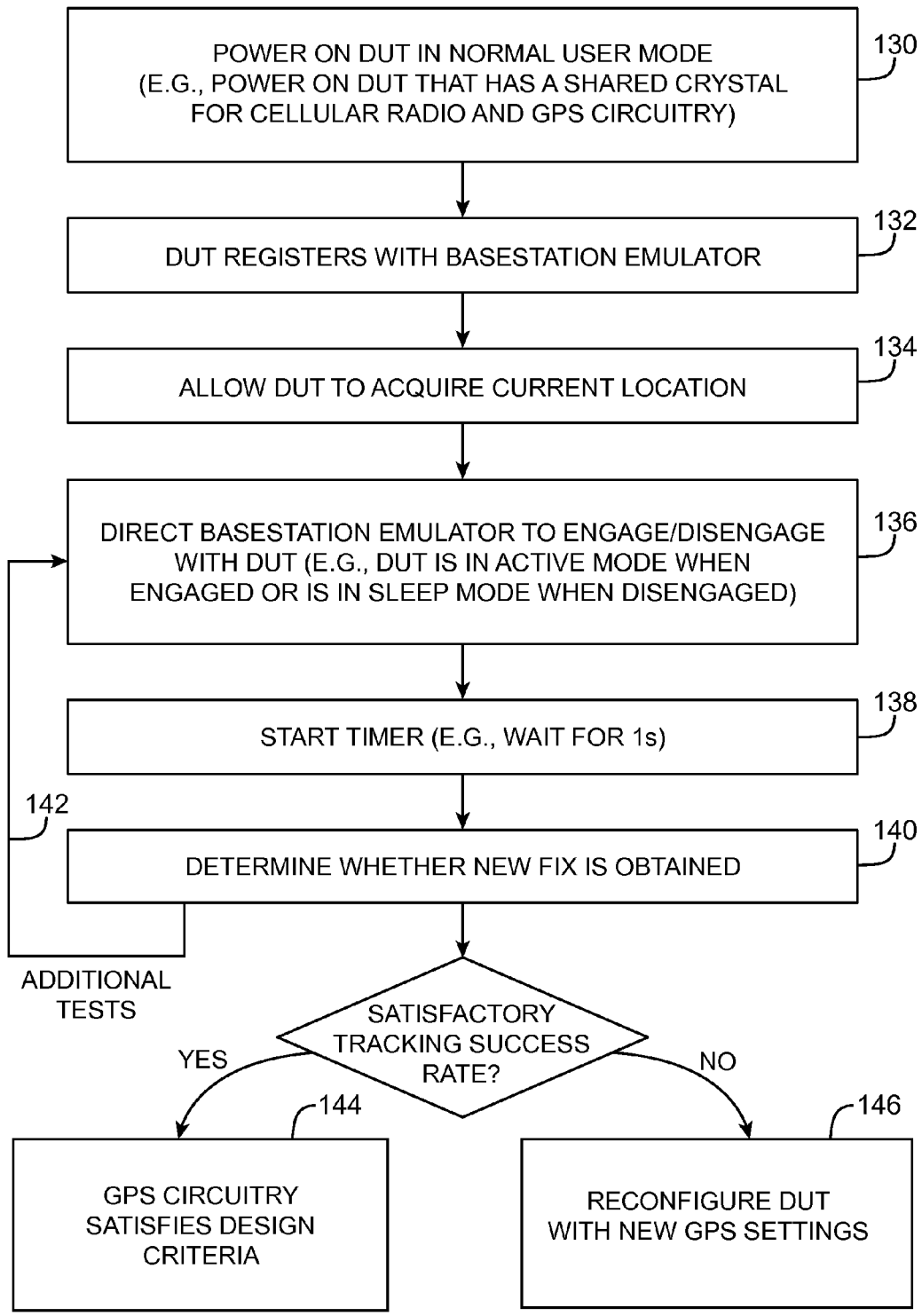
FIG. 10 is a flow chart of illustrative steps involved in signaling tracking mode testing of Global Positioning System receiver performance in accordance with an embodiment of the present invention.

FIG. 10 shows steps involved in tracking mode testing of DUT 10 using the signaling arrangement. DUT 10 may be configured in normal user mode or test mode. At step 130, DUT 10 (e.g., a DUT with a shared crystal for cellular radio and for GPS circuitry) is powered on. At step 132, DUT 10 automatically registers with base station emulator 54. At step 134, DUT 10 may be given sufficient time to acquire a GPS fix.

At step 136, test host 56 may direct base station emulator 54 to engage/disengage with DUT 10. At step 138, a timer may be started to allow GPS receiver 35 to acquire a GPS fix within an allotted tracking time period (e.g., a four seconds time period). At step 140, DUT 10 may determine whether at least two new GPS fixes have been acquired during the allotted time. Data indicating whether or not multiple GPS fixes have been acquired may be stored on test host 56.

GPS location data stored on storage and processing circuitry 28 need not be cleared for tracking mode testing. Processing may loop back to step 136 to perform additional test iterations, as indicated by path 142.

After a sufficient number of test iterations, a tracking success rate may be calculated using test host 56. If the tracking success rate is satisfactory, GPS receiver 35 satisfies design criteria and DUT 10 is marked as a passing DUT (step 144). If tracking success rate is not satisfactory, GPS receiver 35 fails to satisfy design criteria, and DUT 10 may be configured with new design settings aimed to improve GPS performance (step 146).

In another suitable arrangement, DUT 10 may be tested using a "reduced-signaling" test arrangement. The reduced-signaling test approach may be suitable for testing DUT 10 that includes a shared oscillator 42 for cellular circuitry and GPS circuitry (as an example). The reduced-signaling test may involve configuring DUT 10 with a test operating system (e.g., the behavior of DUT 10 may be directly controlled using test host 56). Start-up time $T_{BOOT}$ of DUT 10 with the test operating system may be shorter than $T_{BOOT}$ of DUT 10 loaded with the normal user operating system. Testing DUT 10 using this approach may be referred to as reduced-signal testing, because DUT 10 only responds to commands received over path 60 from test host 56 (e.g., DUT 10 only transmits radio-frequency signals in response to test host commands).

Figure 11:
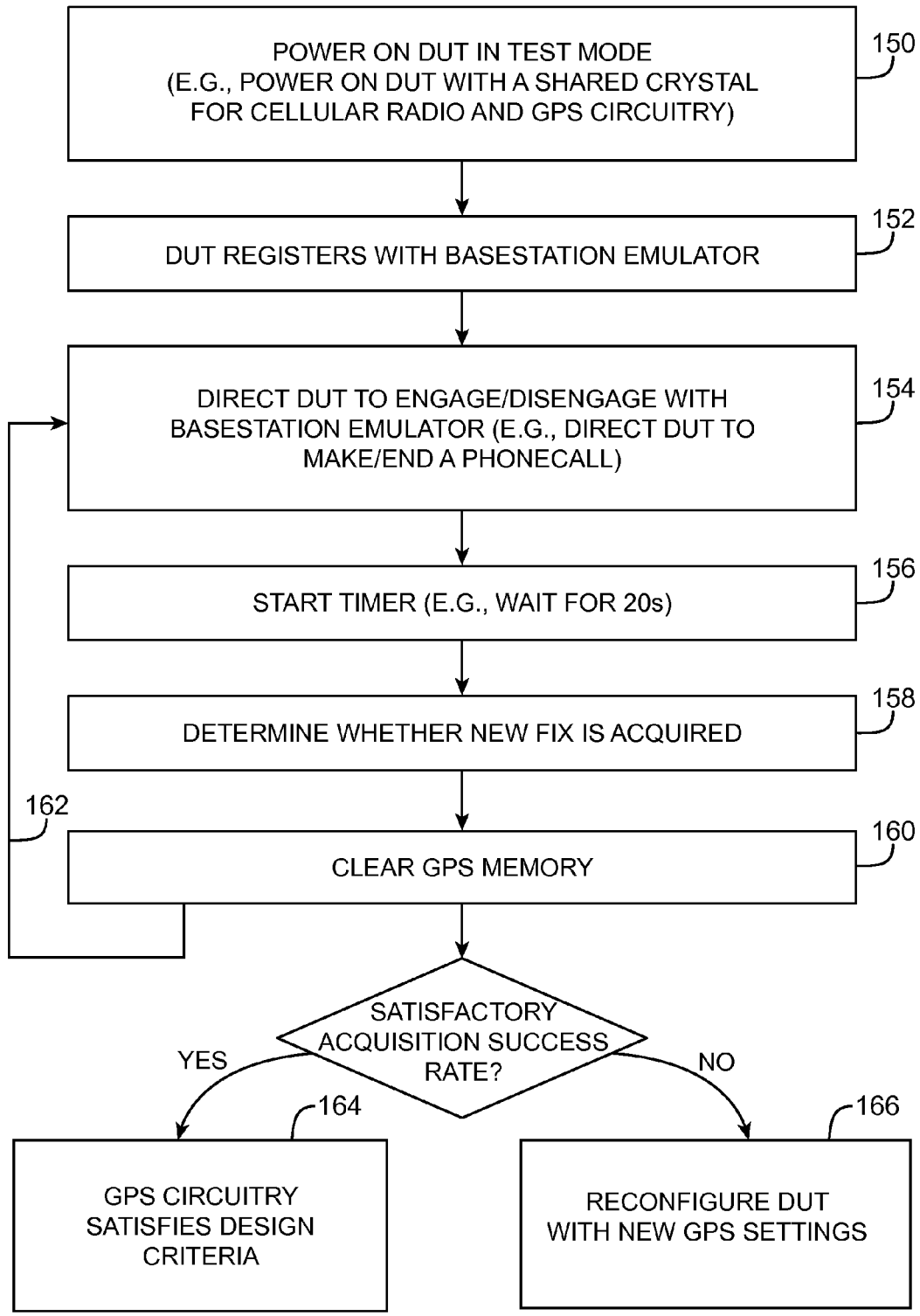
FIG. 11 is a flow chart of illustrative steps involved in reduced-signaling acquisition mode testing of Global Positioning System receiver performance in accordance with an embodiment of the present invention.

FIG. 11 shows steps involved in acquisition mode testing of DUT 10 using the reduced-signaling arrangement. At step 150, DUT 10 (e.g., a DUT with a shared crystal for cellular radio and for GPS circuitry) is powered on. At step 152, test host 56 directs DUT 10 to register with base station emulator 54 (e.g., a protocol-based connection is established between DUT 10 and base station emulator 54).

At step 154, test host 56 may direct DUT 10 to engage/disengage with base station emulator 54. For example, DUT 10 may be directed to make a telephone call to engage base station emulator 54. DUT 10 may be directed to end a telephone call to disengaged base station emulator 54.

At step 156, a timer may be started to allow GPS receiver 35 to acquire a GPS fix within an allotted acquisition time period (e.g., a 20 second time period). At step 158, DUT 10 may determine whether a new GPS fix has been acquired during the allotted time. Data indicating whether or not a GPS fix has been acquired may be stored on test host 56.

At step 160, GPS location data stored on storage and processing circuitry 28 may be cleared to continue acquisition mode testing. Processing may loop back to step 154 to perform additional test iterations, as indicated by path 162.

After a sufficient number of test iterations, an acquisition success rate may be calculated using test host 56. If the acquisition success rate is satisfactory, GPS receiver 35 satisfies design criteria and DUT 10 is marked as a passing DUT (step 164). If acquisition success rate is not satisfactory, GPS receiver 35 fails to satisfy design criteria, and DUT 10 may be configured with new design settings (step 166).

The steps of FIG. 11 are merely illustrative. If desired, test host 56 may direct DUT 10 to engage or disengage with a short-range network emulator (e.g., WiFi® and Bluetooth® transceiver circuits 36 may be toggled on or off at step 154 while cellular radio circuitry 38 remains off during the entirety of the acquisition mode testing). For example, test system 50 may include a network-access-point emulator that can communicate with the WiFi® circuitry in DUT 10 and a mobile device emulator that can communicate with the Bluetooth® circuitry in DUT 10 during testing. Enabling and disabling transceiver circuits 36 may generate rapid changes in $T_{GPS}$ to introduce stress that negatively impacts the performance of GPS receiver 35. If desired, radio circuitry 38 and transceiver circuitry 36 may simultaneously be toggled on or off at step 154 during acquisition mode testing. For example, circuitry 36 and 38 may both be turned on at time t2 and may both be turned off at time t5 (see, e.g., timing diagram of FIGS. 3 and 4).

Figure 12:
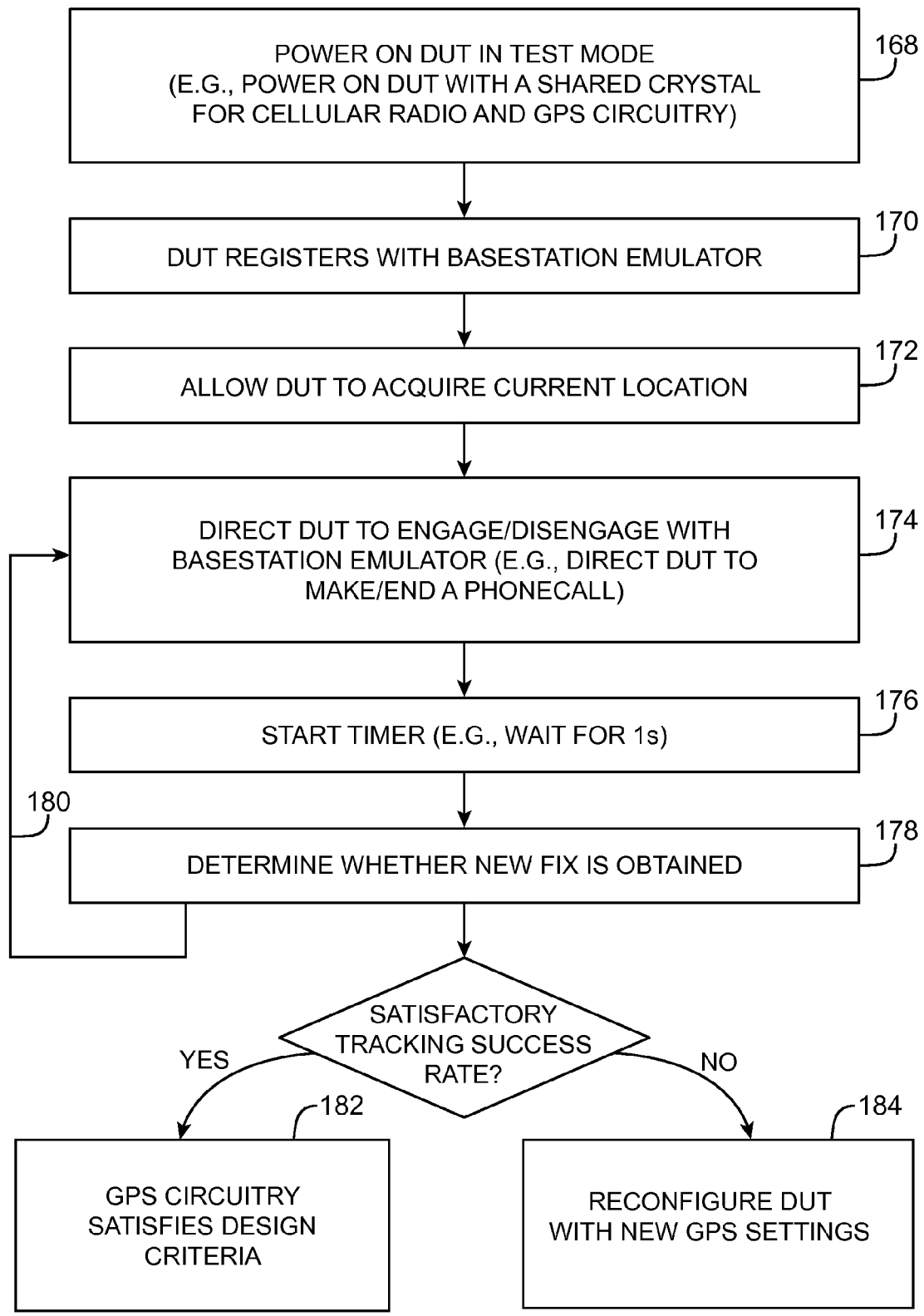
FIG. 12 is a flow chart of illustrative steps involved in reduced-signaling tracking mode testing of Global Positioning System receiver performance in accordance with an embodiment of the present invention.

FIG. 12 shows steps involved in tracking mode testing of DUT 10 using the reduced-signaling arrangement. At step 168, DUT 10 (e.g., a DUT with a shared crystal for cellular radio and for GPS circuitry) is powered on. At step 170, DUT 10 may be directed to register with base station emulator 54. At step 172, DUT 10 may be given sufficient time to acquire a GPS fix.

At step 174, test host 56 may direct DUT 10 to engage/disengage with base station emulator 54. At step 176, a timer may be started to allow GPS receiver 35 to acquire a GPS fix within the allotted tracking time period (e.g., a four seconds time period). At step 178, DUT 10 may determine whether at least two new GPS fixes have been acquired during the allotted time. Data indicating whether or not multiple GPS fixes have been acquired may be stored on test host 56.

GPS location data stored on storage and processing circuitry 28 need not be cleared for tracking mode testing. Processing may loop back to step 174 to perform additional test iterations, as indicated by path 180.

After a sufficient number of test iterations, a tracking success rate may be calculated using test host 56. If the tracking success rate is satisfactory, GPS receiver 35 satisfies design criteria and DUT 10 is marked as a passing DUT (step 182). If tracking success rate is not satisfactory, GPS receiver 35 fails to satisfy design criteria, and DUT 10 may be configured with new design settings aimed to improve GPS performance (step 184).

The steps of FIG. 12 are merely illustrative. If desired, test host 56 may direct DUT 10 to engage or disengage with a short-range network emulator (e.g., WiFi® and Bluetooth® transceiver circuits 36 may be toggled on or off at step 174 while cellular radio circuitry 38 remains off during the entirety of the tracking mode testing). Enabling and disabling transceiver circuits 36 may generate rapid changes in $T_{GPS}$ to introduce stress that negatively impacts the performance of GPS receiver 35. If desired, radio circuitry 38 and transceiver circuitry 36 may simultaneously be toggled on or off at step 174 during tracking mode testing. For example, circuitry 36 and 38 may both be turned on at time t3 and may both be turned off at time t6 (see, e.g., timing diagram of FIGS. 5 and 6).

Steps shown in FIGS. 7-12 are merely illustrative. These validation techniques may be used to test GPS receiver performance during product design and during production testing.

The foregoing is merely illustrative of the principles of this invention and various modifications can be made by those skilled in the art without departing from the scope and spirit of the invention.

What is claimed is:

1. A method of testing a device under test in a test system, wherein the device under test comprises a satellite navigation system receiver and wireless transceiver circuitry, the method comprising:
   with the test system, turning on the wireless transceiver circuitry to transmit radio-frequency signals at a desired output power level; and
   while the wireless transceiver circuitry is transmitting radio-frequency signals at the desired output power level and while the satellite navigation system receiver is rising in temperature as a result of turning on the wireless transceiver circuitry and transmitting radio-frequency signals with the wireless transceiver circuitry, determining whether the satellite navigation system receiver has acquired a satellite navigation system fix.

2. The method defined in claim 1, wherein the wireless transceiver circuitry comprises cellular telephone transceiver circuitry and wherein turning on the wireless transceiver circuitry to transmit the radio-frequency signals comprises:
   directing the cellular telephone transceiver circuitry to transmit the radio-frequency signals.

3. The method defined in claim 1, wherein the wireless transceiver circuitry comprises a wireless local area network (WLAN) transceiver circuit and a Bluetooth transceiver circuit and wherein turning on the wireless transceiver circuitry to transmit the radio-frequency signals comprises:
   directing the wireless local area network transceiver circuit to transmit the radio-frequency signals; and
   directing the Bluetooth transceiver circuit to transmit the radio-frequency signals.

4. The method defined in claim 1, wherein the wireless transceiver circuitry comprises a cellular telephone transceiver circuit, a wireless local area network (WLAN) transceiver circuit, and a Bluetooth transceiver circuit and wherein turning on the wireless transceiver circuitry to transmit the radio-frequency signals comprises:
   directing the cellular telephone transceiver circuit to transmit the radio-frequency signals;
   directing the wireless local area network transceiver circuit to transmit the radio-frequency signals; and
   directing the Bluetooth transceiver circuit to transmit the radio-frequency signals.

5. The method defined in claim 1, wherein turning on the wireless transceiver circuitry to transmit the radio-frequency signals at the desired output power level comprises:
   directing the wireless transceiver circuitry transmit the radio-frequency signals at a maximum output power level.

6. The method defined in claim 1, wherein the test system includes a test host and wherein turning on the wireless transceiver circuitry to transmit the radio-frequency signals comprises:
with the test host, directing the wireless transceiver circuitry to transmit the radio-frequency signals at the desired output power level.

7. The method defined in claim 1, wherein the device under test further comprises storage and processing circuitry, the method further comprising:
with the satellite navigation system receiver, calculating satellite navigation system information; and
storing the calculated satellite navigation information in the storage and processing circuitry.

8. The method defined in claim 7, further comprising:
clearing the satellite navigation system information from the storage and processing circuitry prior to determining whether the satellite navigation system receiver has acquired the satellite navigation system fix.

9. The method defined in claim 1, wherein determining whether the satellite navigation system receiver has acquired the satellite navigation system fix comprises:
determining whether the satellite navigation system receiver has acquired the satellite navigation system fix within a predetermined time period.

10. The method defined in claim 1, wherein the device under test includes a first crystal oscillator associated with the satellite navigation system receiver and a second crystal oscillator associated with the wireless transceiver circuitry, the method further comprising:
loading the device under test with a test operating system, wherein the device under test lacks a graphical user interface when configured with the test operating system.

11. The method defined in claim 1, further comprising:
turning off the wireless transceiver circuitry to prevent the wireless transceiver circuitry from transmitting radio-frequency signals; and
while the wireless transceiver circuitry is turned off and while the satellite navigation system receiver is falling in temperature as a result of turning off the wireless transceiver circuitry, determining whether the satellite navigation system receiver has acquired an additional satellite navigation system fix.

12. A method of testing a device under test in a test system, wherein the device under test includes a satellite navigation system receiver and wireless transceiver circuitry and wherein the test system includes a base station emulator, the method comprising:
directing the base station emulator to wirelessly communicate with the wireless transceiver circuitry in the device under test; and
while the wireless transceiver circuitry is transmitting radio-frequency signals to wirelessly communicate with the base station emulator and while the satellite navigation system receiver is rising in temperature as a result of transmitting the radio-frequency signals with the wireless transceiver circuitry, determining whether the satellite navigation system receiver has acquired a satellite navigation system fix.

13. The method defined in claim 12, wherein the test system further includes a test host and wherein directing the base station emulator to wirelessly communicate with the wireless transceiver circuitry in the device under test comprises:
with the test host, directing the base station emulator to wirelessly communicate with the wireless transceiver circuitry in the device under test.

14. The method defined in claim 13, further comprising:
with the base station emulator, detecting the presence of the device under test, wherein the test host directs the base station emulator to communicate wirelessly with the device under test in response to detecting the presence of the device under test.

15. The method defined in claim 12, wherein the device under test further comprises storage and processing circuitry, the method further comprising:
with the satellite navigation system receiver, calculating satellite navigation system information; and
storing the calculated satellite navigation information in the storage and processing circuitry.

16. The method defined in claim 15, further comprising:
clearing the satellite navigation system information prior from the storage and processing circuitry to determining whether the satellite navigation system receiver has acquired the satellite navigation system fix.

17. The method defined in claim 12, wherein determining whether the satellite navigation system receiver has acquired the satellite navigation system fix comprises:
determining whether the satellite navigation system receiver has acquired the satellite navigation system fix within a predetermined time period.

18. The method defined in claim 12, wherein the device under test includes a given crystal oscillator and wherein the satellite navigation system receiver and the wireless transceiver circuitry share the given crystal oscillator, the method further comprising:
loading the device under test with a normal user operating system, wherein the device under test has a graphical user interface when configured with the normal user operating system.

19. The method defined in claim 12, wherein the device under test includes a given crystal oscillator and wherein the satellite navigation system receiver and the wireless transceiver circuitry share the given crystal oscillator, the method further comprising:
loading the device under test with a test operating system, wherein the device under test lacks a graphical user interface when configured with the test operating system.

20. The method defined in claim 12, further comprising:
directing the base station emulator to terminate wireless communication with the wireless transceiver circuitry in the device under test; and
while the wireless communication between the base station emulator and the wireless transceiver circuitry in the device under test is suspended and while the satellite navigation system receiver is rising in temperature as a result of terminating the wireless communication, determining whether the satellite navigation system receiver has acquired an additional satellite navigation system fix.

21. A method of testing a device under test in a test system, wherein the device under test includes a satellite navigation system receiver and wireless transceiver circuitry and wherein the test system includes a base station emulator, the method comprising:
directing the wireless transceiver circuitry in the device under test to wirelessly communicate with the base station emulator;
while the wireless transceiver circuitry is transmitting radio-frequency signals to wirelessly communicate with the base station emulator and while the satellite navigation system receiver is rising in temperature as a result of transmitting the radio-frequency signals with the wireless transceiver circuitry, determining whether the satellite navigation system receiver has acquired a satellite navigation system fix.

22. The method defined in claim 21, wherein the test system further includes a test host and wherein directing the wireless transceiver circuitry in the device under test to wirelessly communicate with the base station emulator comprises:
with the test host, directing the wireless transceiver circuitry in the device under test to wirelessly communicate with the base station emulator.

23. The method defined in claim 21, wherein the device under test further comprises storage and processing circuitry, the method further comprising:
with the satellite navigation system receiver, calculating satellite navigation system information; and
storing the calculated satellite navigation information in the storage and processing circuitry.

24. The method defined in claim 23, further comprising:
clearing the satellite navigation system information from the storage and processing circuitry prior to determining whether the satellite navigation system receiver has acquired the satellite navigation system fix.

25. The method defined in claim 21, wherein determining whether the satellite navigation system receiver has acquired the satellite navigation system fix comprises:
determining whether the satellite navigation system receiver has acquired the satellite navigation system fix within a predetermined time period.

26. The method defined in claim 21, wherein the device under test includes a given crystal oscillator and wherein the satellite navigation system receiver and the wireless transceiver circuitry share the given crystal oscillator, the method further comprising:
loading the device under test with a test operating system, wherein the device under test lacks a graphical user interface when configured with the test operating system.

27. The method defined in claim 21, further comprising:
directing the wireless transceiver circuitry in the device under test to terminate wireless communication with the base station emulator; and
while the wireless communication between the base station emulator and the wireless transceiver circuitry in the device under test is suspended and while the satellite navigation system receiver is rising in temperature as a result of terminating the wireless communication, determining whether the satellite navigation system receiver has acquired an additional satellite navigation system fix.

28. The method defined in claim 21, wherein the wireless transceiver circuitry comprises cellular telephone transceiver circuitry and wherein directing the wireless transceiver circuitry in the device under test to wirelessly communicate with the base station emulator comprises:
directing the cellular telephone transceiver circuitry to transmit the radio-frequency signals.

29. The method defined in claim 21, wherein the wireless transceiver circuitry comprises a wireless local area network (WLAN) transceiver circuit and a Bluetooth transceiver circuit and wherein directing the wireless transceiver circuitry in the device under test to wirelessly communicate with the base station emulator comprises:
directing the wireless local area network transceiver circuit to transmit the radio-frequency signals; and
directing the Bluetooth transceiver circuit to transmit the radio-frequency signals.

30. The method defined in claim 21, wherein the wireless transceiver circuitry comprises a cellular telephone transceiver circuit, a wireless local area network (WLAN) transceiver circuit, and a Bluetooth transceiver circuit and wherein directing the wireless transceiver circuitry in the device under test to wirelessly communicate with the base station emulator comprises:
directing the cellular telephone transceiver circuit to transmit the radio-frequency signals;
directing the wireless local area network transceiver circuit to transmit the radio-frequency signals; and
directing the Bluetooth transceiver circuit to transmit the radio-frequency signals.

\* \* \* \* \*